United States Patent [19]

Cho

[11] 3,873,936

[45] Mar. 25, 1975

[54] APPARATUS FOR REDUCING DISTORTION IN A REPEATED TRANSMISSION SYSTEM

[75] Inventor: Yo-Sung Cho, North Andover, Mass.

[73] Assignee: Bell Telephone Laboratories, Incorporated, Murray Hill, N.J.

[22] Filed: Mar. 7, 1974

[21] Appl. No.: 448,814

[52] U.S. Cl. .............................. 330/124 R, 330/149

[51] Int. Cl. .............................................. H03f 3/68

[58] Field of Search ................ 330/124 R, 149, 151; 325/474–476; 328/163

[56] References Cited

UNITED STATES PATENTS 3,725,806 4/1973 Darlington .......................... 330/149

*Primary Examiner*—James B. Mullins
*Attorney, Agent, or Firm*—Daniel D. Dubosky

[57] ABSTRACT

The distortion generated due to the nonlinear characteristics of the power amplifier in a repeater network is substantially reduced by generating a compensating signal in a feedforward amplifier network. In the feedforward network an auxiliary amplifier having substantially the same gain and distortion characteristics as the main power amplifier generates a compensating signal having a linear component equal to the linear component of the output signal of the power amplifier and a distortion component equal in magnitude to the distortion component of the output signal of the power amplifier. The phase relationship between the linear and distortion components at the output of the auxiliary amplifier is, however, opposite to the phase relationship between the linear and distortion components of the power amplifier. Thus, when the compensating signal is combined with the output of the power amplifier, the distortion components are substantially canceled and the linear components are added. The substantially distortion-free output signal has greater power than was obtainable in prior art feedforward distortion reduction networks.

6 Claims, 4 Drawing Figures

APPARATUS FOR REDUCING DISTORTION IN A REPEATED TRANSMISSION SYSTEM

BACKGROUND OF THE INVENTION

This invention relates to repeatered transmission systems and, more particularly, to the reduction of the distortion generated by nonlinear power amplifying stages in the repeater.

In wideband coaxial cable transmission systems in which the signal must pass through a large number of repeater stages between transmitting and receiving stations, the distortion generated by the power amplifying stages in each repeater plays a significant role in the degradation of signal quality. It is desired, therefore, to keep the distortion generated at each repeater stage as low as possible.

Prior art feedforward amplifier techniques, such as disclosed by H. Seidel in U.S. Pat. No. 3,471,790 issued Oct. 7, 1969, could reduce the distortion generated by the power amplifying stage. In the Seidel patent, an input signal is divided into two portions, one portion of the signal being coupled to a main power amplifier that introduces distortion due to its nonlinearity, with the remaining portion being coupled to a parallel second signal path. The amplified distorted signal in the first signal path comprising a linear and distrotion component is attenuated and combined with the undistorted signal in the second signal path such that the linear signal components cancel. The resultant signal comprising solely a distortion component is reamplified by an auxiliary amplifier to produce a distortion signal equal in magnitude to the distortion component at the output of the main power amplifier. When this distortion signal at the output of the auxiliary amplifier is combined with the linear and distortion components at the output of the main power amplifier, the distortion components are canceled. The resultant feedforward amplifier output signal is thus substantially equal to the distortion-free linear component at the output of the main amplifier. Since, however, the auxiliary amplifier amplifies only a distortion component, the magnitude of the feedforward amplifier output signal is determined by the amplification factor of the main power amplifier and the signal loss in the output coupler. Thus, since the auxiliary amplifier does not contribute to the feedforward amplifier power output, the output power is thus limited by the power output capabilities of the main power amplifier, and is less than the output power of the main amplifier due to the signal loss in the output coupler.

In U.S. Pat. No. 3,725,806 issued Apr. 3, 1973 to S. Darlington, a distortion reducing amplifier is disclosed in which an auxiliary network generates a compensating signal comprising both linear and distortion components. When, however, the distortion and linear components in the auxiliary network are combined with the linear and distortion components at the output of the main distortion producing power amplifying network to cancel the distortion components, the linear components are of such phase relationship that the resultant linear component is less than the linear component at the output of the main power amplifying network. Therefore, the auxiliary network reduces the power output of the main power amplifying network.

Neither of these prior art distortion reducing amplifiers has been able, because of their limited power output capabilities, to provide a sufficient distortion-free power output for certain repeatered transmission system applications.

An object of this invention is to increase the power output of a repeater in a wideband transmission system by simultaneously reducing or canceling the distortion introduced by the nonlinear power amplifier stage.

SUMMARY OF THE INVENTION

A repeater amplifier constructed in accordance with the present invention substantially reduces or cancels the distortion generated due to the nonlinear characteristics of a power amplifier while providing an output which has substantially greater signal power than the prior art low-distortion amplifiers. In accordance with the present invention, and unlike the distortion reducing amplifiers in either the aforenoted Seidel or Darlington patents, an auxiliary amplifier having substantially the same gain and distortion characteristics as the main power amplifier generates a signal having both a linear and distortion component, the magnitude of each component being equal to the magnitude of the linear and distortion components, respectively, at the output of the main power amplifier. However, the phase relationship between the distortion and linear components at the output of the auxiliary amplifier is opposite to the phase relationship between the distortion and linear components at the output of the main power amplifier. As a result, when the output of the auxiliary amplifier is combined with the output of the main power amplifier, the distortion components are canceled and the linear components are reinforced.

In the present invention, as in the aforenoted Seidel patent, the input signal power is divided into two portions, one portion of the input signal being coupled to the nonlinear main power amplifier and the remaining portion coupled to a second signal path. A coupler crosscouples and combines the linear and distortion components at the output of the main amplifier with the portion of the input signal coupled to the second signal path and the resultant combined signal is applied to the auxiliary amplifier. The coupler is chosen to have a preselected cross-coupling attenuation factor which is a function of the gain characteristic of the power amplifier and the ratio of input signal power division. The magnitude of the linear component of the resultant combined signal at the input to the auxiliary amplifier can thus be predetermined to be equal to the magnitude of the linear signal input to the main amplifier, and the phase relationship between the linear and distortion components of the combined signal can also be predetermined to be opposite to the phase relationship between the linear and distortion components at the output of the main amplifier. Since the gain characteristic of the auxiliary amplifier is equal to the gain characteristic of the main power amplifier, the linear component of the output signal of the auxiliary amplifier is equal in magnitude to the linear component at the output of the main amplifier. Furthermore, the sum of the distortion component generated by the auxiliary amplifier in response to its linear input component plus the distortion component of the input signal to the auxiliary amplifier that has been amplified by the auxiliary amplifier is equal in magnitude to the distortion component at the output of the main amplifier. However, the phase relationship between the linear and distortion components at the output of the auxiliary amplifier is opposite to the phase relationship between the linear and distortion components at the output of the main amplifier. Thus, when the output of the auxiliary amplifier is combined with the output of the main amplifier, the distortion components are canceled and the signal components are reinforced. The resultant signal is thus substantially free of distortion. Furthermore, both the main amplifier and the auxiliary amplifier each contribute to the power output to provide an output signal having greater power than that which is provided by the prior art feedforward method.

DETAILED DESCRIPTION

Figure 1:
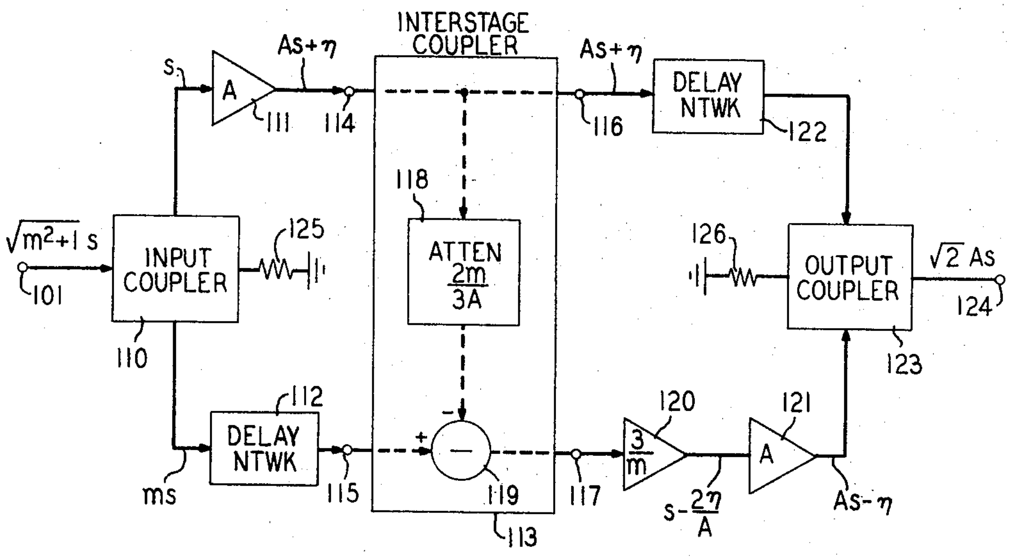
FIG. 1 is a block diagram of a repeater amplifier constructed in accordance with the present invention where both distortion cancellation and increased power output are obtained.

The present invention, one embodiment of which is illustrated in FIG. 1, accomplishes distortion reduction with an increased power output previously unobtainable in prior art distortion-reducing amplifiers. As illustrated in FIG. 1, an input distortion-free signal is applied at input terminal 101 to an input coupler 110. Input coupler 110 may be one of several power-dividing couplers well known in the art, for example, a hybrid coil arrangement or an isolation transformer. As illustrated in FIG. 1, input coupler 110 is a four-port network with two input ports and two output ports, one input port being connected to ground through balancing resistor 125. In order for one of the output-coupled signals to have a unitary coefficient, the input signal at terminal 101 is represented by $\sqrt{m^2+1}\, s$, where $s$ is a time varying signal. The output signals can thus be made to be $s$ and $ms$, respectively. The output signal $s$ will thus be the reference signal from which all network and signal comparisons hereinafter will be made. The coefficient $m$ is determined by the selection of input coupler 110. For example, if a 10 dB input coupler is employed, $m$ is equal to 3. Similarly, if a 3 dB input coupler is employed, $m$ is equal to 1, and the input signal power would be divided evenly to the two output ports of input coupler 110. The signal $s$ is applied to a power amplifier 111. Although illustrated as comprising one amplifier stage, power amplifier 111 may comprise a plurality of tandem connected amplifying stages. For purposes of the discussion hereinafter, the overall gain factor of power amplifier 111 is represented as A, the magnitude of which is generally much larger than one. Due to the nonlinearities of power amplifier 111, the output signal of power amplifier 111 consists of an amplified linear signal component $As$ and a distortion component $\eta$, the latter being produced in response to the input signal $s$. Therefore, the output of power amplifier 111 may be represented by the sum of the amplified signal component and the distortion component $As + \eta$.

The signal at the second output of input coupler 110, designated herein as $ms$, is applied to a delay network 112. The delay of delay network 112 is chosen to be equivalent to the delay of the signal $s$ through amplifier 111. Thus, the amplified signal, $As+\eta$, and the delayed signal, $ms$, at the output of delay network 112 are coincident in time.

Figure 2:
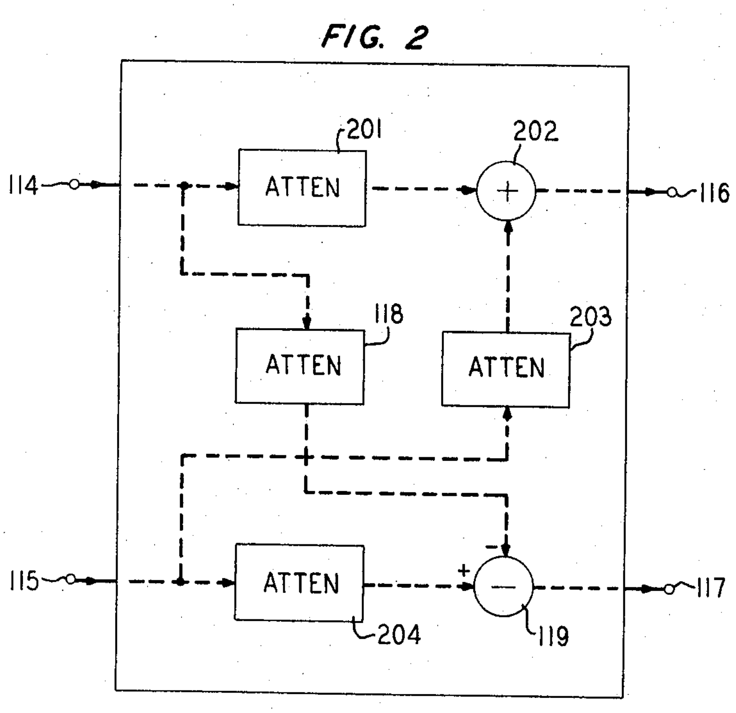
FIG. 2 is a functional block diagram representative of an interstage coupler which may be employed in the present invention.

The output signal from amplifier 111 and the output signal from delay network 112 are applied to ports 114 and 115, respectively, of an interstage coupler 113. Interstage coupler 113 is a four-port power loss-free network well known in the art as, for example, a hybrid coil arrangement or an isolation transformer. The dotted signal paths and attenuator 118 and subtractor 119 within interstage coupler 113 are only shown to illustrate the functional input-output port relationship and thus do not represent actual signal paths or network components. The functional relationships between the input port signals and the output port signals of interstage coupler 113 are illustrated in FIG. 2 where the signal paths and network components are only functional representations. Similar numerical designations are given to those functional network components in FIG. 2 that are identical to the functional network components in FIG. 1.

With reference to FIG. 2, a signal at input port 114 is coupled to output ports 116 and 117. Similarly, the signal at port 115 is coupled to output ports 117 and 116. In accordance with the type of interstage coupler employed in the embodiment of the present invention illustrated in FIGS. 1 and 2, a 180° phase shift is introduced into the signal coupled between ports 114 and 117. If, however, input coupler 110 introduced a 180° degree phase shift between the signals $s$ and $ms$, interstage coupler 113 would not be required to introduce another 180° phase shift. Since input coupler 110 in FIG. 1 does not introduce a phase shift, interstage coupler 113 is illustrated in FIGS. 1 and 2 as phase shifting the coupled signal between ports 114 and 117. The attenuation caused by the coupling between ports 114 and 116 is represented by attenuator 201 and the attenuation caused by the coupling between ports 115 and 117 is represented by attenuator 204. The coupling attenuatioon between ports 114 and 117, and ports 115 and 116, is represented by attenuators 118 and 203, respectively. The output signal at port 116 is equal to the sum of the coupled signals from ports 114 and 115. Thus, the output signal at port 116 is illustrated in FIG. 2 as being equal to the output of adder 202 where the inputs to the adder are the attenuated signal from port 114 and the attenuated signal from port 115. The output signal at port 117 is equal to the sum of the coupled signals from ports 115 and 114. As heretofore noted, however, the coupling signal between ports 114 and 117 is 180° phase shifted. Therefore, the output signal at port 117 is illustrated as being the difference formed by subtractor 119 between the coupled signals from ports 115 and 114.

Since the coupling between ports 114 and 116, and ports 115 and 117, is chosen to be generally high, the attenuation caused by attenuators 201 and 204 between the respective input and output ports can be assumed to be negligible. Thus, the functional representation in FIG. 2 of interstage coupler 113 can be illustrated as having a direct connection from port 114 to adder 202 and a direct connection between port 115 to subtractor 119.

As heretofore noted, the signal at port 114 has a linear signal component A$s$ that has been amplified by power amplifier 111, the magnitude of which is chosen to be much greater than the signal $ms$ at port 115. Furthermore, since the signal at port 115 is attenuated by the attenuation factor of attenuator 203 which is high, the contribution of the coupler signal from port 115 to the coupled signal A$s$ can be assumed to be negligible. Thus, for purposes of the discussion hereinafter, the output signal at port 116 can be solely represented by the direct-coupled unattenuated signal from input port 114, and thus will be assumed to be equal to the input signal at port 114. Therefore, the output signal of interstage coupler 113 at output port 116 will be assumed, for purposes of the discussion hereinafter, to be equal to the signal $As + \eta$ at port 114. Since the coupling between ports 115 and 117 has been assumed to be high, the signal at output port 117 may be represented by the difference between the signal at port 115 and the coupled attenuated signal from port 114.

With reference again to FIG. 1, interstage coupler 113 is functionally simplified in accordance with the attenuation factors discussed hereinabove by illustrating port 114 as being directly connected to port 116 and to attenuator 118, the attenuation factor of the latter being representative of the coupling factor between ports 114 and 117. Since as heretofore noted there is a 180° phase reversal between ports 114 and 117, the output of attenuator 118 is subtracted by subtractor 119 from the signal at terminal 115 to produce the output signal at port 117. The magnitude of the signal at port 117 is thus determined by the coupling factor of interstage coupler 113 and is represented by the attenuation factor of attenuator 118.

Output port 117 of interstage coupler 113 is connected to an amplifier 120. The output of amplifier 120 is connected to an auxiliary power amplifier 121. Auxiliary power amplifier 121 is chosen to be substantially identical to the distortion-producing main power amplifier 111. Thus, each input signal is amplified by a gain factor A. Furthermore, in response to an input signal $s$, a distortion component $\eta$ is generated which is equal in phase and magnitude to the distortion component of the signal at the output of power amplifier 111. In accordance with the present invention, it is desired to produce, as an output of auxiliary power amplifier 121, a signal having a linear component equal in phase and magnitude to the linear component of the output of main power amplifier 111, and a distortion component equal in magnitude and reversed in phase to the distortion component of the output of power amplifier 111. Thus, when the signal at the output of main power amplifier 111 is combined with the output of auxiliary power amplifier 121, the distortion components cancel and the linear components add.

In order for auxiliary power amplifier 121 to generate a linear output component equal to the linear component of the output of power amplifier 111, the signal input of auxiliary power amplifier 121 must necessarily be equivalent to $s$, the signal input of power amplifier 111. With $s$ at its input, auxiliary power amplifier 121 will generate a distortion component $\eta$. However, if the input to auxiliary power amplifier 121 is predistorted and consists of the sum of a linear component $s$ and a distortion component $-2\eta/A$, which magnitude is very small compared to the magnitude of $s$, then the combination of the distortion component internally generated by auxiliary power amplifier 121 and the amplified input predistortion component will produce, at the output of auxiliary amplifier 121, a distortion component $-\eta$. The output signal of auxiliary power amplifier 121 will thus be equal to $As-\eta$.

In order to obtain the desired signal output from auxiliary power amplifier 121, the cross-coupling between terminals 114 and 117 of interstage coupler 113 and the amplification factor of amplifier 120 must be appropriately determined. It can be shown that if interstage coupler 113 has a cross-coupling factor of $2m/3A$ and amplifier 120 has a gain of $3/m$, then the output of amplifier 120 will be $s-(2\eta/A)$ and the output of auxiliary power amplifier 121 will be $As-\eta$ as desired. The attenuation factor of attenuator 118 is thus illustrated to be $2m/3A$ and the gain of amplifier 120 is illustrated as being $3/m$ in FIG. 1. Since, as heretofore noted, the value of $m$ is determined by input coupler 110, amplifier 120 will not be necessary in all design situations. Therefore, as heretofore noted, if input coupler 110 is a 10 dB coupler, then $m$ will be equal to three and the gain of amplifier 120 will be one. Hence, with a 10 dB input coupler, amplifier 120 is replaced by a direct connection between terminal 117 and the input of auxiliary power amplifier 121. Similarly, if $m$ is greater than three, then the gain of amplifier 120 is less than one and amplifier 120 can be replaced by a passive attenuator network having an attenuation factor of $3/m$.

The output terminal 116 of interstage coupler 113 is connected to delay network 122. The delay of delay network 122 is chosen to compensate for the delay of the signal at terminal 117 through amplifier 120 and auxiliary power amplifier 121. The output signal from delay network 122 is thus coincident in time with the output signal from auxiliary power amplifier 121.

The output of delay network 122, $As + \eta$, and the output of auxiliary power amplifier 121, $As - \eta$, are combined by output coupler 123. Output coupler 123 may be one of several networks well known in the art as, for example, a hybrid coil. If, for example, output coupler 123 is a 3 dB coupler, then the output signal at output terminal 124 will be, as illustrated in FIG. 1, $\sqrt{2}As$. The distortion component of the signal at the output of delay network 122 is cancelled in output coupler 123 by the distortion component at the output of auxiliary power amplifier 121 to produce a substantially distortion-free output signal at output terminal 124. Furthermore, the linear signal components advantageously reinforce each other to generate a high power distortion-free signal.

Figure 3:
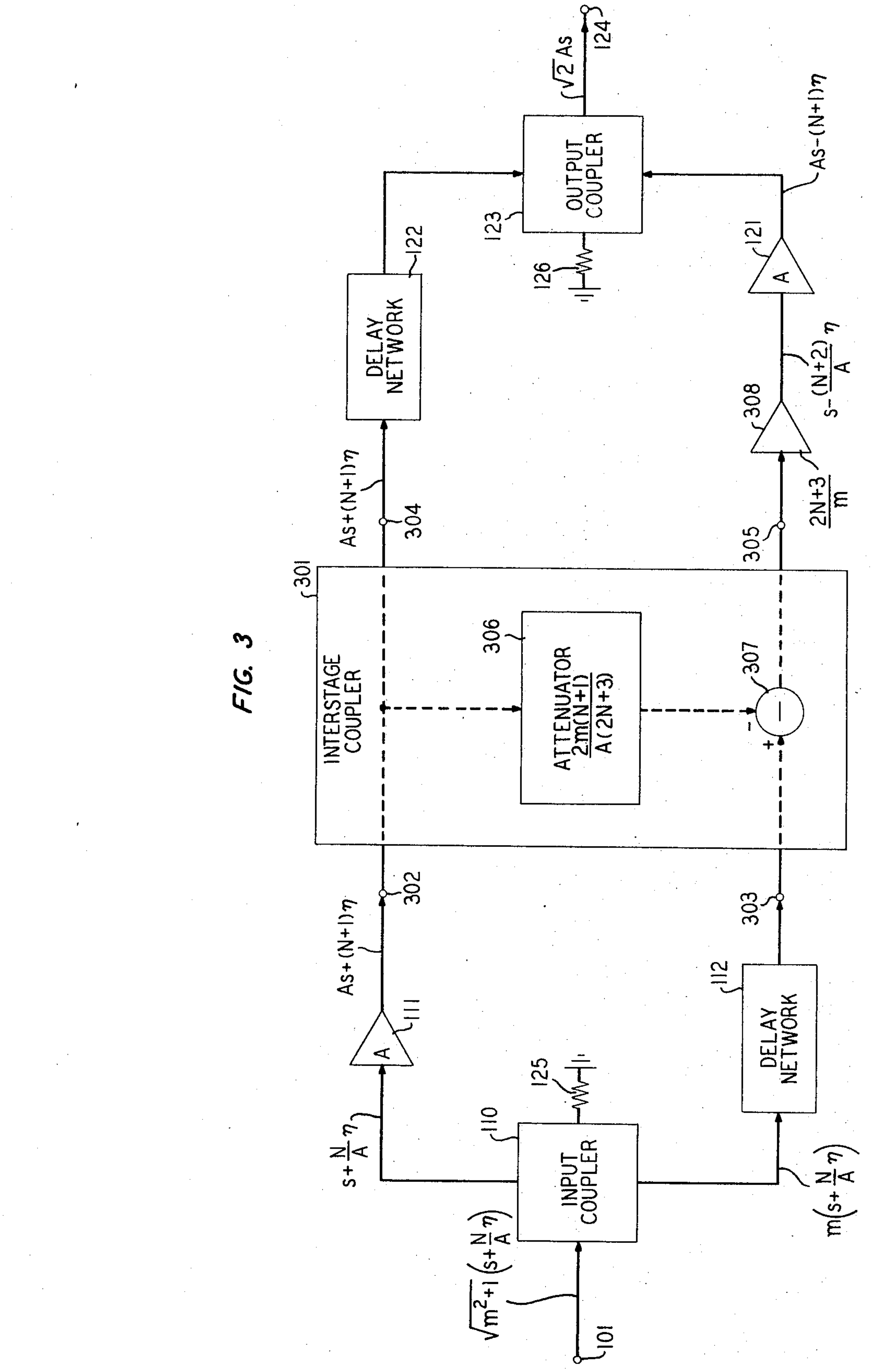
FIG. 3 is an embodiment of the present invention which can be employed to periodically overcompensate the distortion accumulated from uncompensated repeaters in a repeatered transmission system.

Distortion compensation has heretofore been assumed to occur at every repeater in the transmission path. The teachings of the present invention can also be applied to a system where distortion components are accumulated through N uncompensated repeaters and then overcompensated at each N + 1st repeater in the transmission path. FIG. 3 illustrates an embodiment of the present invention in which such overcompensation can be achieved. Similar numerical designations are given to those network components in FIG. 3 that are identical to similar network components in FIG. 1.

The input signal at terminal 101 that is applied to input coupler 110 is illustrated in FIG. 1 as being equal to $\sqrt{m^2+1}\,(s + (N/A)\eta)$. Thus, the input signal is not distortion free but has a distortion component equal to the accumulation of distortion components in N previous similar repeaters. As heretofore explained in connection with FIG. 1, input coupler 110 divides the input signal at terminal 101 into two components, $s + (N/A)\eta$ and $m(s + (N/A)\eta)$. The signal $s + (N/A)\eta$ is applied to the input of power amplifier 111. Power amplifier 111 amplifies the linear signal component and the distortion component input by the gain factor A. However, due to the nonlinearities of power amplifier 111, an additional distortion component, $\eta$, is generated in response to the linear component $s$ of the input signal. Thus, the output signal from power amplifier 111 can be represented as $As + (N+1)\eta$.

The second output of input coupler 110 is applied to delay network 112. The delay of delay network 112 is chosen to be equivalent to the delay of the signal $s + (N/A)\eta$ through amplifier 111. The power amplified signal and the delayed signal at the output of delay network 112 are therefore coincident in time.

The output signal from power amplifier 111 and the output signal from delay network 112 are applied to input ports 302 and 303, respectively, of interstage coupler 301. Interstage coupler 301 is similar to interstage coupler 113, described heretofore in connection with FIGS. 1 and 2. The assumptions made with respect to interstage coupler 113 in FIGS. 1 and 2 will therefore be similarly applied herein. Thus, the output signal of power amplifier 111 is coupled without loss to the output port 304 of interstage coupler 301. Similarly, the output signal of power amplifier 111 at input port 302 is coupled with attenuation, phase reversed, and combined with the signal at port 303 to produce the output signal at port 305. The coupling factor of interstage coupler 301 is represented by the attenuation factor of attenuator 306. Subtractor 307 represents the functional combination of the coupled signal at port 303 with the coupled phase-reversed signal from port 302. The output signal at port 305 is applied to amplifier 308, the output of the latter being connected to auxiliary power amplifier 121. As discussed in connection with FIG. 1, power amplifier 121 is chosen to be substantially identical to power amplifier 111. Since it is desired to produce, as the output signal of auxiliary amplifier 121, a signal having a linear component $As$ and a distortion component $-(N+1)\eta$, the input signal to amplifier 121 should accordingly be $s-[(N+2)/A]\eta$. It can be shown that if an interstage coupler having a coupling factor of $2m(N+1)/A(2N+3)$ is chosen in combination with amplifier 308 having a gain $(2N+3)/m$, then the output of amplifier 308 will be $s-[(N+2)/A]\eta$ and the output of auxiliary power amplifier 121 will be $As-(N+1)\eta$. The attenuation factor of interstage coupler 301 is thus illustrated in FIG. 3 as being $2m(N+1)/A(2N+3)$ and the gain of amplifier 308 is illustrated as being $(2N+3)/m$. As heretofore discussed in connection with FIG. 1, amplifier 308 will not be necessary in all design situations and, depending on the selection of input coupler 110 and the value N, amplifier 308 may be replaced by either a direct connection from terminal 305 to amplifier 121 or a passive attenuator.

The output port 304 of interstage coupler 301 is connected to delay network 122. The delay of delay network 122 is chosen to compensate for the delay of the signal at terminal 305 through amplifier 308 and auxiliary power amplifier 121. The output signal of delay network 122 is thus coincident in time with the output signal of auxiliary power amplifier 121.

The output of delay network 122, $As + (N+1)\eta$, and the output of auxiliary power amplifier 121, $As - (N+1)\eta$, are combined by output coupler 123. If output coupler 123 is a 3 dB coupler, then the output signal at terminal 124 will be illustrated in FIG. 3, $\sqrt{2}As$ and the distortion components generated in the previous N uncompensated repeaters and by the power amplifier in this (N+1)st repeater are cancelled.

Figure 4:
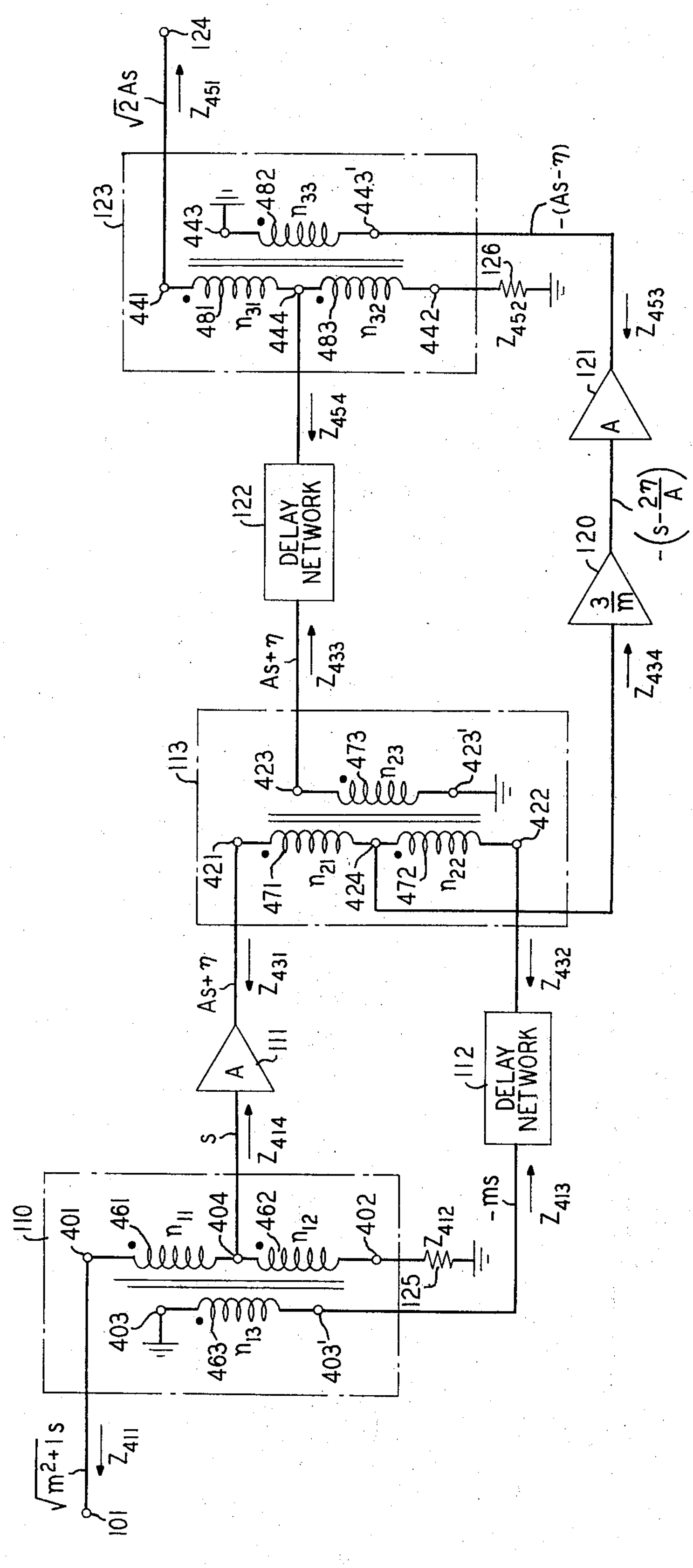
FIG. 4 is an embodiment of the present invention which employs isolation transformers as signal couplers.

An embodiment of the present invention that employs isolation transformers for input coupler 110, interstage coupler 113, and output coupler 123 is illustrated in FIG. 4. Similar numerical designations are given to those components in FIG. 4 that are identical to those components represented in FIG. 1. With reference to FIG. 4, input coupler 110 is an isolation transformer that has three windings, 461, 462 and 463, each respectively having $n_{11}$, $n_{12}$ and $n_{13}$ turns. Input terminal 101 is connected to terminal 401. Balancing impedance 125 is connected to terminal 402, delay network 112 is connected to terminal 403', and the input of amplifier 111 is connected to terminal 404.

As discussed heretofore in connection with FIG. 1, it is desired to couple the input signal $\sqrt{m^2+1}\,s$ at input terminal 101 to the input of amplifier 111 and the delay network 112 such that the input to amplifier 111 is $s$ and the input to delay network 112 is $ms$. In order for input coupler 110 to couple properly the signal at terminal 401 to terminals 403' and 404, the coupler must be balanced. Thus, the impedance seen by each port and the number of turns on each winding must be correctly determined. Assuming that the number of turns on winding 463 is equal to $n_{13}$, that the impedance of the signal source applied to input terminal 101 is known and has a value $Z_{411}$, and that the input impedance of delay network 112 is known and equal to $Z_{413}$, then the number of turns required on windings 461 and 463 can be derived using techniques well known in the art. Derivation of the relationship between the input impedances, turn ratios and terminal-to-terminal transmission losses have been found, for example, in an article entitled "On Hybrid Transformers," by H. O. Friedheim, *ATE Journal*, Volume 14, No. 3, July 1958, pages 218–228. Employing formulas derived in the above-noted article, the transmission loss between terminals 401 and 404 can be shown to be equal to $10 \log |1 + (Z_{411}/Z_{412})|$ dB, where $Z_{412}$ is the value of balancing impedance 125. Since it is desired to couple the signal $\sqrt{m^2+1}\,s$ at terminal 401 to signal $s$ at terminal 404, the transmission loss must be $10 \log (m^2+1)$. dB. Thus, the necessary value of balancing impedance 125 can be determined to be:

$$Z_{412} = Z_{411}/m^2 \tag{1}$$

Similarly, the number of turns on winding 462 can be shown to be:

$$n_{12} = n_{11}/m^2 \tag{2}$$

and the number of turns on winding 463 can be shown to be:

$$n_{13} = (n_{11}+n_{12}) \sqrt{(Z_{413}/Z_{411}+Z_{413})} \tag{3}$$

Furthermore, in order for isolation transformer 110 to be balanced, the input impedance $Z_{414}$ of amplifier 111 must be:

$$Z_{414} = (Z_{411}\ Z_{412})/(Z_{411}+Z_{412}) \quad (4)$$

If amplifier 111 does not have the proper input impedance as defined by Equation (4) above, then an impedance-matching transformer can be connected between terminal 404 and ground of input coupler 110 and the input of amplifier 111.

The phase of the signal coupled to winding 463 from terminal 401 can be determined by the connection of terminal 403 and terminal 403'. When terminal 403 is connected as the high side of the output port, the coupled signal is in phase with the signals at terminals 401 and 404. When, however, terminal 403' is connected as the high side of the output port, the coupled signal will be out-of-phase with the signals at terminals 401 and 404. Therefore, since the input of delay network 112 is connected to terminal 403' the terminal *ms* is 180° out-of-phase with the signal *s* at terminal 404 and is thus equal to −ms.

Interstage coupler 113 has three windings, 471, 472 and 473, each respectively having $n_{21}$, $n_{22}$ and $n_{23}$ turns. The coupling between terminal 421 to terminal 424 is desired to be $2m/3A$. Assuming that the output impedance $Z_{431}$ of amplifier 111 and the input impedance $Z_{433}$ of delay network 122 are known, together with the number of turns $n_{21}$ on winding 471, the remaining network parameters can be derived such that interstage coupler 113 will be properly balanced and give the desired coupling between ports.

Since the coupling coefficient between terminals 421 and 424 is to be $2m/3A$, the dB transmission loss between these terminals can be easily shown to be $10 \log (3A/2m)^2$ dB. As heretofore discussed in connection with input coupler 110, the transmission loss between terminals 421 and 424 can be expressed in terms of the impedance seen by terminal 421 and the impedance seen by terminal 422. Thus, the transmission loss between terminals 421 and 424 is equal to $10 \log | 1 + (Z_{431}/Z_{432}) |$dB, where $Z_{432}$ is the output impedance of delay network 111. The output impedance of delay network 112 must therefore be $$Z_{432}\ [Z_{431}\,(2m/3A)^2]/[1-(2m/3A)^2] \quad (5)$$

If delay network 112 does not have the proper output impedance, an impedance-matching transformer can be connected between the output of delay network 112 and terminal 422.

The number of turns required for windings 472 and 473 can be determined by:

$$n_{22} = n_{21}(Z_{432}/Z_{431}) \quad (6)$$

and $$n_{23} = (n_{21} + n_{22}) \quad \sqrt{Z_{433}}/(Z_{431} + Z_{433}) \quad (7)$$

The impedance needed to be seen by terminal 424 to correctly balance interstage coupler 113 can be determined from:

$$Z_{434} = (Z_{431}\ Z_{432})/(Z_{431}+Z_{432}) \quad (8)$$

If the input impedance to amplifier 120 is not $Z_{434}$, then an impedance-matching transformer can be connected between terminal 424 and the input of amplifier 120.

Since, as aforenoted, input coupler 110 has effected a 180° phase shift between the signal through amplifier 111 and the signal through delay network 112, interstage coupler 113 does not have to introduce a further phase reversal. The signal coupled to terminal 424 of interstage coupler 113 is equal to the sum of the coupled attenuated signals from terminals 421 and 422, respectively. However, since the signal at terminal 422 is equal to $-ms$, the signal at terminal 424 is equal to the difference between the coupled attenuated signal from terminal 421 and *ms* from terminal 422, the latter signal substantially unattenuated since the transmission loss between terminals 422 and 424 can be easily shown to be negligible. Since the gain of amplifier 120 is appropriately chosen to be $3/m$, the input signal to amplifier 121 will be $-s + (2/A)\eta$. The output of amplifier 121 is thus equal to A times this applied input signal, plus the distortion component $-\eta$ generated in response to the linear input component $-s$. Therefore, the resultant signal output of amplifier 121 is $-As + \eta$ as illustrated in FIG. 4.

The signal at terminal 423 is equal to the sum of the coupled attenuated signals from terminals 421 and 422, respectively. Since the transmission loss between terminals 421 and 423 can be shown to be negligible and the contribution of the strongly attenuated signal from terminal 422 is small, the signal at terminal 423 is substantially equal to the signal at terminal 421, and is thus equal to $As + \eta$.

The output of delay network 122 is connected to terminal 444 of output coupler 123 and the output of amplifier 121 is connected to terminal 443'. Terminal 442 is connected to ground potential through balancing resistor 126, the latter having a value $Z_{452}$. Repeater output terminal 124 is connected directly to terminal 441.

Output coupler 123 comprises three windings, 481, 482 and 483, each respectively having $n_{31}$, $n_{32}$ and $n_{33}$ turns. For purposes of this illustrative example, output coupler 123 will be assumed to be a symmetrical 3 dB coupler such that the transmission loss between terminals 443' and 441, and between terminals 444 and 441 is 3 dB. Since the transmission losses are equal, the signals at terminals 444 and 443 equally contribute to the output at terminal 441. Since the output of amplifier 123 is connected to terminal 443' rather than the phase reversed output 443, the signal at terminal 441 equals the difference between the 3 dB attenuated signals at terminals 441 and 443'. The output signal at terminal 441 and, thus, at repeater output terminal 124, can thus be easily shown to be $\sqrt{2}\,As$ since the distortion components are cancelled.

The necessary impedance and turn relationships can be determined such that output coupler 123 will be a balanced 3 dB coupler. Assuming that the output impedance $Z_{451}$ of the repeater network and the output impedance $Z_{453}$ of amplifier 121 are known, together with the number of turns $n_{31}$ on winding 481, then the remaining coupler variables can be determined. The value of $Z_{452}$ of balancing impedance 126 equals $Z_{451}$ and the number of turns $n_{32}$ of coil 483 is equal to the number of turns $n_{31}$ on coil 481. The output impedance $Z_{454}$ of delay network 122 should be equal to one-half the impedance $Z_{451}$. If the output impedance of delay network 122 is not equal to $Z_{451}$, an impedance-matching transformer can be connected between the output of delay network 122 and terminal 444. The number of turns $n_{33}$ on winding 482 can be determined from $$n_{33} = 2n_3 \sqrt{Z_{453}/2Z_{451}} \quad (9)$$

The above-described arrangements are illustrative of the application of the principles of the invention. Other embodiments may be devised by those skilled in the art without departing from the spirit and scope thereof.

What is claimed is:

1. In a repeatered transmission system having a plurality of repeater amplifiers connected in a transmission path between a transmitting and receiving station at least one of said repeater amplifiers comprising an input terminal for receiving an input signal, two signal paths, the first of said signal paths including in cascade a main amplifier and a first delay line, said main amplifier introducing signal distortion due to the nonlinearity of said main amplifier, the second of said signal paths including in cascade a second delay line and an auxiliary amplifier, said auxiliary amplifier having substantially the same gain and distortion characteristics as said main amplifier, first coupling means connecting said input terminal with said first signal path and said second signal path to couple a portion of said input signal to said first signal path and the remaining portion of said input signal to said second signal path, second coupling means connecting the outputs of said main amplifier and said second delay line with the inputs of said first delay line and said auxiliary amplifier to couple to the input of said auxiliary amplifier at least a portion of the output of said main amplifier and the output of said second delay line, the magnitude of the linear component of the input signal to said auxiliary amplifier being substantially equal to the magnitude of the linear component of the input signal to said main amplifier, the phase relationship between the linear and distortion components of the input signal to said auxiliary amplifier being opposite to the phase relationship between the linear and distortion components of the output signal of said main amplifier, the magnitudes of the linear and distortion components of the output signal of said auxiliary amplifier each being respectively equal to the magnitudes of the linear and distortion components of the output signal of the main amplifier, the phase relationship between the linear and distortion components of the output signal of said auxiliary amplifier being opposite to the phase relationship between the linear and distortion components of the output signal of said main amplifier, an output terminal, and combining means connecting the output of said first delay line with the output of said auxiliary amplifier and said output terminal to combine the delayed linear and distortion components of the output signal of said main amplifier with the linear and distortion components of the output signal of said auxiliary amplifier such that the linear components are added and the distortion components are canceled whereby the output signal at said output terminal is substantially free from distortion.

2. A repeater amplifier for a transmission system as defined in claim 1 further including signal multiplying means connected between the output of said second coupling means in said second signal path and the input of said auxiliary amplifier to multiply the output of said second coupling means by a predetermined factor.

3. A repeater amplifier for a repeatered transmission system as defined in claim 2 wherein the magnitude of the portion of said input signal coupled to said second signal path is $m$ times the magnitude of the input signal coupled to the first signal path, said main and auxiliary amplifiers have a gain factor of A, said second coupling means couples $2m/3A$ times the output of said main amplifier to said second signal path, and said signal multiplying means has a gain factor of $3/m$, where $m$ is a non-zero positive value.

4. A feed-forward amplifier configuration for providing a substantially distortion-free amplification of an input signal comprising first and second amplifier means having substantially identical amplification and distortion characteristics, a first and second delay network means each having an input terminal and an output terminal, an input coupler means for coupling to an input of said first amplifier means a portion of said input signal and for coupling the remaining portion of said input signal to the input terminal of said first delay network, a four-port interstage coupling means for coupling a signal at the output of said first amplifier means substantially unaltered to the input terminal of said second delay network means and for coupling both a portion of the output signal from said first amplifier means and the signal at the output terminal of said first delay network means to the input of said second amplifier means, output coupling means for developing an output signal by combining signals at the output terminal of said second delay network means with the output of said second amplifier means, the phase characteristics of said input coupling means and said interstage coupling means being arranged such that the phase relationship between the amplified linear and distortion components at the output of said second amplifier means is opposite the phase relationship between the amplified linear and distortion components at the output of said first amplifier means.

5. A feed-forward amplifier configuration as defined in claim 4 wherein said input, interstage and output coupling means each include a hybrid transformer.

6. A feed-forward amplifier configuration comprising an input terminal for receiving an input signal, a first power amplifier which produces linear and distortion components at its output in response to a signal at its input due to its nonlinearity, a first and second delay network means each having an input terminal and an output terminal, an input coupler means for coupling to the input of said first power amplifier a portion of said input signal and for coupling the remaining portion of said input signal to the input terminal of said first delay network means, a four-port interstage coupler having first and second input terminals and first and second output terminals with substantially no attenuation between said first input terminal and said first output terminal, means for coupling the output of said first power amplifier to the first input terminal of said interstage coupler, means for connecting the output terminal of said first delay network means to the second input terminal of said interstage coupler, means for connecting the first output terminal of said interstage coupler to the input terminal of said second delay network, and an output coupler means having first and second input terminals with its first input terminal connected to the output terminal of said second delay-means for developing an output signal by combining the signal at the output terminal of said second delay network means with a signal presented at the second input terminal of the output coupler means, characterized in that said input coupler means and said interstage coupler are designed to couple to the second output terminal of said interstage coupler a signal having linear and distortion components with a phase relationship to each other opposite to the phase relationship between the linear and distortion components at the output of said first main amplifier, and the second output terminal of said interstage coupler is coupled to the second input terminal of said output coupler means by a second power amplifier having amplification and distortion characteristics substantially identical to said first power amplifier.

* * * * *